United States Patent
Murakami

(10) Patent No.: US 10,550,536 B2
(45) Date of Patent: Feb. 4, 2020

(54) OIL FILM RECOVERY APPARATUS AND OIL FILM RECOVERY METHOD

(71) Applicant: NIHONSOKUKI K.K., Tokyo (JP)

(72) Inventor: Nariyoshi Murakami, Tokyo (JP)

(73) Assignee: NIHONSOKUKI K.K., Tokyo (JP)

( * ) Notice: Subject to any disclaimer, the term of this patent is extended or adjusted under 35 U.S.C. 154(b) by 0 days.

(21) Appl. No.: 16/386,616

(22) Filed: Apr. 17, 2019

(65) Prior Publication Data

US 2019/0242087 A1    Aug. 8, 2019

Related U.S. Application Data

(63) Continuation of application No. PCT/JP2017/035770, filed on Oct. 2, 2017.

(30) Foreign Application Priority Data

Oct. 17, 2016  (JP) ................. 2016-203844

(51) Int. Cl.
*E02B 15/10* (2006.01)
*C02F 1/40* (2006.01)
*E02B 15/04* (2006.01)

(52) U.S. Cl.
CPC .............. *E02B 15/106* (2013.01); *C02F 1/40* (2013.01); *E02B 15/045* (2013.01); *E02B 15/048* (2013.01)

(58) Field of Classification Search
CPC ........... E02B 15/10; E02B 15/106; C02F 1/40
(Continued)

(56) References Cited

U.S. PATENT DOCUMENTS 4,060,487 A * 11/1977 Samsel ................. E02B 15/046
                                                          210/242.3
5,108,591 A *  4/1992 Hagan .................. E02B 15/106
                                                          210/242.3
(Continued)

FOREIGN PATENT DOCUMENTS

JP        S4987268 U    7/1974
JP        S5541814 A    3/1980
(Continued)

OTHER PUBLICATIONS

English translation of Written Opinion issued in Intl. Appln. No. PCT/JP2017/035770 dated Dec. 5, 2017, previously cited in IDS filed Apr. 17, 2019.
(Continued)

*Primary Examiner* — Christopher Upton
(74) *Attorney, Agent, or Firm* — Rossi, Kimms & McDowell LLP

(57) ABSTRACT

The tip of a suction hose is supported by a floating support mechanism so that the suction port is maintained at a prescribed distance above the water surface and the base end of said suction hose is connected to the suction port of a turbofan. By the suction force of the turbofan, the oil film floating on the water surface is sucked along with the air above the water surface and the surface water through the suction hose from the suction port. The mixed fluid of air, oil and water that is delivered from the delivery port of the turbofan is sent to an oil-water separation device. The air is released into the atmosphere, and the oil and water are separated. For the turbofan, the rotational force of a separately disposed motor is transmitted by a belt transmission mechanism and rotates an impeller.

15 Claims, 3 Drawing Sheets

(58) Field of Classification Search
USPC ...... 210/170.05, 170.09, 170.11, 242.3, 776, 210/923

See application file for complete search history.

(56) References Cited

U.S. PATENT DOCUMENTS

| | | | | |
|---|---|---|---|---|
| 5,118,412 | A * | 6/1992 | Schmidt | E02B 15/106 210/242.3 |
| 5,143,629 | A * | 9/1992 | Lint | E02B 15/106 210/242.3 |
| 7,153,418 | B2 * | 12/2006 | Mauro, Sr. | A01K 63/00 210/170.09 |
| 9,017,548 | B2 * | 4/2015 | Lee | E02B 15/106 210/242.3 |
| 9,194,094 | B1 * | 11/2015 | Sobel | E02B 15/106 |
| 9,365,995 | B2 * | 6/2016 | James | E02B 15/106 |
| 2006/0151385 | A1 * | 7/2006 | Burrows | C02F 7/00 210/600 |

FOREIGN PATENT DOCUMENTS

| | | |
|---|---|---|
| JP | S5786688 U | 5/1982 |
| JP | 2000176450 A | 6/2000 |
| JP | 2003276680 A | 10/2003 |
| JP | 2004052723 A | 2/2004 |

OTHER PUBLICATIONS

Iternational Preliminary Report on Patentability issued in Intl. Appln. No. PCT/JP2017/035770 dated Apr. 23, 2019. English translation provided.

International Search Report issued in Intl. Appln. No. PCT/JP2017/035770 dated Dec. 5, 2017. English translation provided.

Written Opinion issued in Intl. Appln. No. PCT/JP2017/035770 dated Dec. 5, 2017.

* cited by examiner

OIL FILM RECOVERY APPARATUS AND OIL FILM RECOVERY METHOD

TECHNICAL FIELD

This invention relates to an oil film recovery apparatus and an oil film recovery method for efficiently recovering an oil film floating on a water surface.

BACKGROUND

In a case where oil leaked to a pit, a drain, or the like in a factory has flowed out to a river, the sea, or the like, or oil has flowed out to a river, the sea, or the like due to illegal dumping, an accident, or the like, and the like, an oil film floats on a water surface thereof. Such an oil film floating on the water surface is required to be quickly and consistently recovered.

The absence of complete recovery of the oil film leaked to a river, the sea, or the like causes such environmental pollution as has a serious adverse effect on fishes, algae, and the other underwater creatures. Further, the absence of quick recovery causes the oil film to adhere to stones, wall surfaces, or the like of a riverbank or seashore, resulting in making the recovery difficult.

Therefore, conventionally, there have been proposed various recovery apparatuses and recovery methods for such an oil film. As the mainstream thereof, there has been employed a system in which a submersible pump or a suction pump (pump to suck water) draws the oil film below a water surface and sucks up it.

In this system, by disposing a suction port of a suction hose in a position close to the water surface in the water, and sucking by using the submersible pump or the suction pump, the oil film is sucked together with surface water. The sucked oil-water mixed solution is stored in an oil-water separation tank and separated into oil and water by various oil-water separation devices of a cyclone system, a corrugation system, and the like, and the water is drained as it is, and the oil is recovered and reused.

However, in such a conventional recovery system of an oil film, while sucking a large amount of water, the oil film on a water surface thereof is recovered, so that a ratio of oil in the recovered oil-water mixed solution has been very small to be generally 0.1% or less. Therefore, there have been problems that very long time is required for the recovery of the oil film and, a huge oil-water separation tank is needed and long treatment time of oil-water separation is also required, and the like.

Further, when the oil film on the water surface is sucked together with the large amount of water, the oil film becomes fine drops and disperses in the water, so that it has been very difficult to recover all of them.

In order to solve such problems, the present inventor has proposed, in advance, an oil film recovery method and an oil film recovery apparatus for not performing the recovery of the oil film floating on the water surface from the water, but sucking and recovering it from above the water surface, as described in Patent Literature 1.

These have been the ones intended to make a suction port of a tip portion of a suction hose downward face an upper portion at a height of 5 to 200 mm from the water surface, and to suck and recover the oil film together with air and water from the suction port of the suction hose by using a suction mechanism of the suction pump or the like.

Further, for example, Patent Literature 2 also discloses a spilled oil recovery apparatus in which a suction port of a suction pipe of an oil suction device is disposed above the water surface, and oil floated on the water surface is sucked and recovered from above the water surface.

CITATION LIST

Patent Literature

{PTL1} JP 2000-176450 A
{PTL2} JP 2003-276680 A

SUMMARY

However, as a pump in the suction mechanism in the oil film recovery method and the oil film recovery apparatus described in Patent Literature 1, a suction pump to mainly suck water similarly to the one previous thereto has been used. Therefore, when the interior of the pump is not filled with water, sucking operation becomes impossible, thereby resulting in sucking and recovering the oil film together with a large amount of surface water after all, which has made it impossible to sufficiently increase a ratio of oil in the recovered oil-water mixed solution.

Further, in the spilled oil recovery apparatus disclosed in Patent Literature 2, it is described that a vacuum pump is used as a pump of the oil suction device. However, the vacuum pump is a pump to obtain a vacuum or a low-pressure state close thereto by discharging gas from the interior of a container.

Therefore, even though the suction port is operated in a state open to the atmosphere, the interior of the suction pipe does not become close to a vacuum state, to thereby make the suction immediately impossible. That is, an operation time is short to be in about minutes.

Further, the suction port sucks a large amount of surface water when too close to the water surface. Because the vacuum pump does not have a structure in which liquid such as oil or water is sucked, sucking liquid causes the vacuum pump to fail and go out of operation in a short period of time. Hence it is not applicable to practical use.

Even though the vacuum pump is used as the pump in the suction mechanism of the apparatus described in Patent Literature 1, it is not applicable to practical use similarly due to occurrence of a similar problem.

Moreover, in order that such an oil film recovery apparatus can recover a large amount of oil film continuously, continuous operation for long periods (for example, ten thousand to thirty thousand hours or longer) is required to be secured. However, such an apparatus has not been realized yet.

This invention has been made in order to solve the above-described problems, and it is an object thereof to make it possible to efficiently recover an oil film floating on a water surface by significantly reducing the amount of water sucked when the oil film is recovered and make continuous operation for long periods possible.

An oil film recovery apparatus according to this invention, in order to achieve the above-described object, includes: a suction hose; a floating support mechanism which supports a tip portion of the suction hose so that a suction port is maintained at a predetermined distance above a water surface; a turbofan including a turbo-shaped impeller in a casing having an intake port and a delivery port, in which a base end portion of the suction hose is connected to the intake port; a motor disposed to be separated from the turbofan; and a belt transmission mechanism which transmits rotational force of the motor to the turbofan to rotate and drive the impeller, wherein an oil film floating on the water surface is sucked and recovered together with air over the water surface and surface water near the water surface from the suction port through the suction hose by suction force of the turbofan.

Moreover, it is preferable to include an oil-water separation device which releases air from a mixed fluid of air, oil and water delivered from a delivery port of the turbofan into an atmosphere, and separates oil and water.

It is desirable that a suction force of the turbofan is 2 kPa or more.

It is preferable that the motor is a brushless motor.

An oil film recovery method according to this invention, in order to achieve the above-described object, includes: supporting a tip portion portion of a suction hose so that a suction port is maintained at a predetermined distance above a water surface; and sucking and recovering an oil film floating on the water surface together with air over the water surface and surface water near the water surface from the suction port through the suction hose by suction force of a turbofan generated by transmitting rotational force of a motor disposed to be separated from the turbofan via a belt transmission mechanism to the turbofan to rotate and drive a turbo-shaped impeller of the turbofan.

It is desirable that a suction force of the turbofan is 2 kPa or more.

According to an oil film recovery apparatus and an oil film recovery method according to this invention, it is possible to efficiently recover an oil film floating on a water surface by significantly reducing the amount of water sucked when the oil film is recovered. Moreover, continuous operation for long periods is possible.

DESCRIPTION OF EMBODIMENTS

Hereinafter, an embodiment to carry out this invention will be specifically explained based on the drawings.

Figure 1:
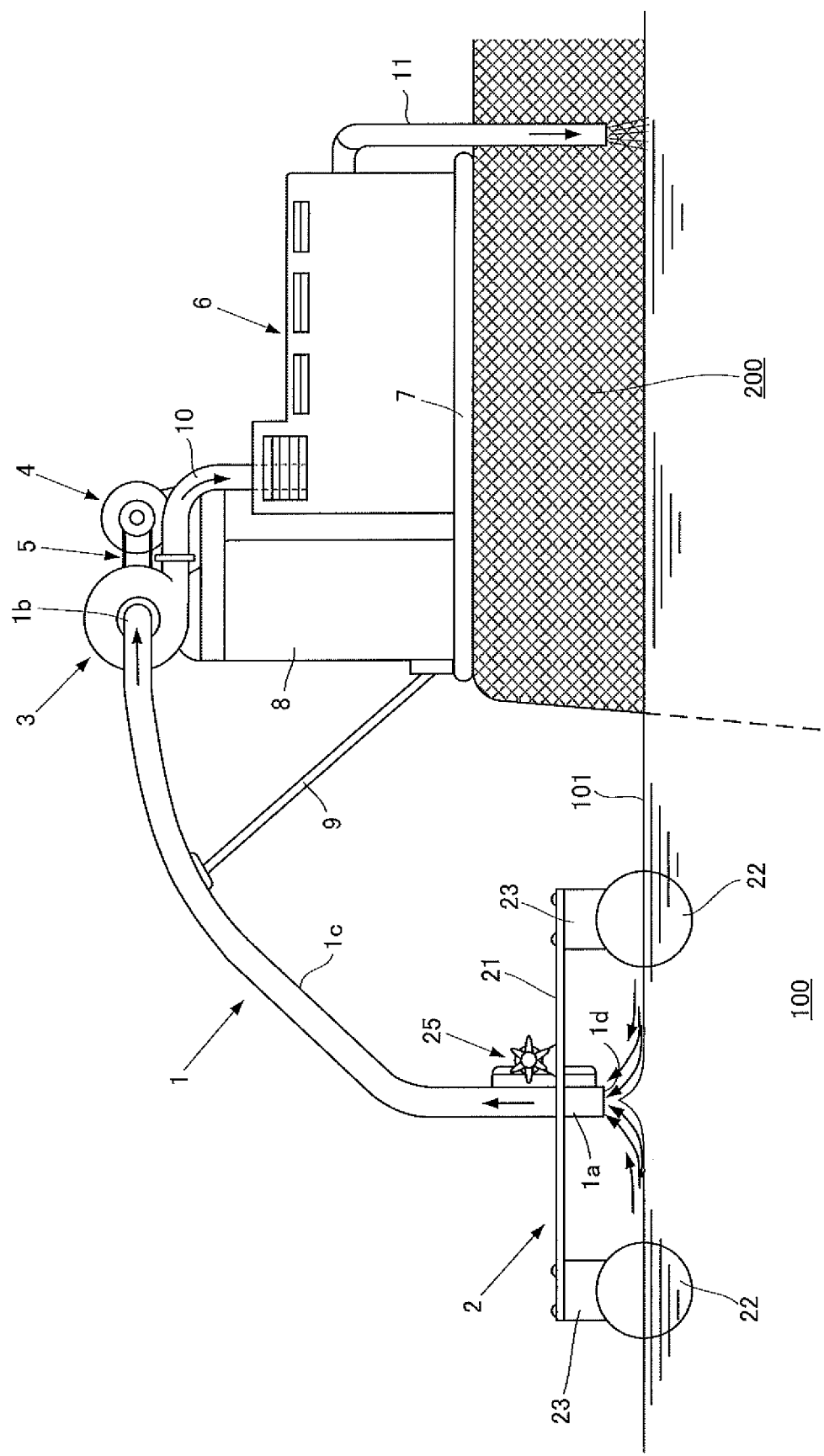
FIG. 1 is a schematic side view showing a use state of one embodiment of an oil film recovery apparatus according to this invention.

FIG. 1 is a schematic side view showing a use state of one embodiment of an oil film recovery apparatus according to this invention. In this FIG. 1, 100 is water of a river, the sea, a lake, a swamp, a pond, a pool, or the like, and an oil film floats on a water surface 101 thereof 200 is a land being in contact with the water.

The oil film recovery apparatus includes at least a suction hose 1, a floating support mechanism 2, a turbofan 3, a motor 4 and a belt transmission mechanism 5.

The suction hose 1 is supported by the floating support mechanism 2 so that a suction port 1d of a tip portion 1a thereof is maintained at a predetermined distance above the water surface 101.

Figure 2:
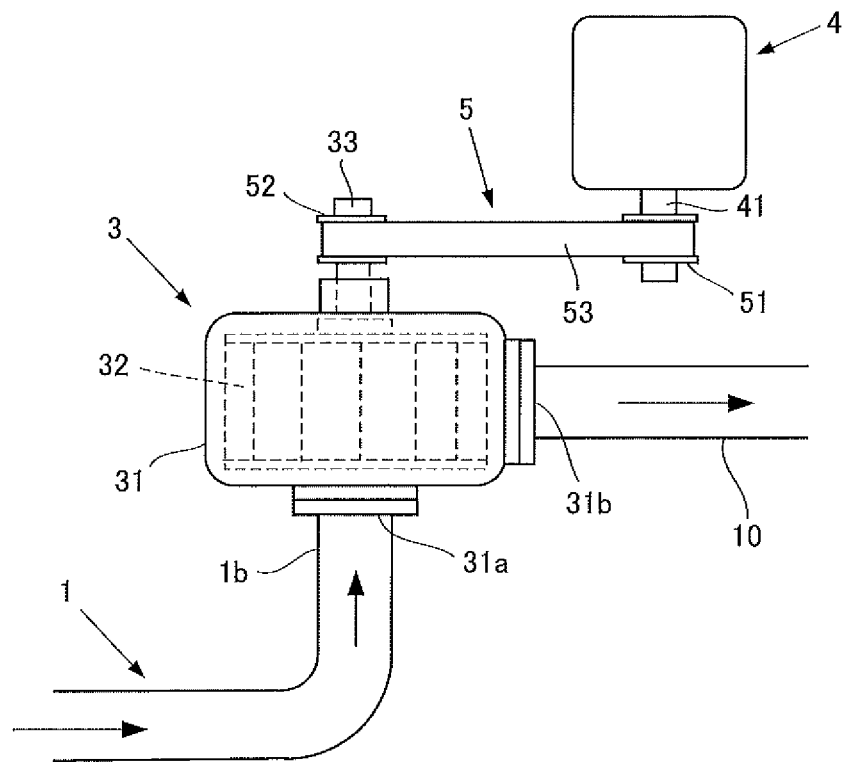
FIG. 2 is a plan view enlarging and showing a turbofan and parts related thereto in FIG. 1.

As shown in an enlarged plan view in FIG. 2, the turbofan 3 includes a turbo-shaped impeller 32 in a casing 31 having an intake port 31a and a delivery port 31b, and a base end portion 1b of the suction hose 1 is connected to the intake port 31a.

The motor 4 is disposed to be separated from the turbofan 3, and transmits its rotational force via the belt transmission mechanism 5 to the turbofan 3 to rotate and drive the impeller 32.

Then, the oil film floating on the water surface 101 is sucked and recovered together with air over the water surface 101 and surface water of the water surface 101 from the suction port 1d through the suction hose 1 by suction force of the turbofan 3. In order to obtain the suction force sufficiently, the suction force of the turbofan 3 is desirably 2 kPa or more.

In the embodiment shown in FIG. 1, moreover, an oil-water separation tank 6 is included as an oil-water separation device which releases air from a mixed fluid of air, oil and water delivered from the delivery port 31b of the 3 through a delivery pipe 10 into the atmosphere, and separates the oil and the water. The water separated in the oil-water separation tank 6 is discharged through a drainage pipe 11 and returned to the water 100 of a river or the like.

When this oil film recovery apparatus is explained in more detail, a frame 8 and the oil-water separation tank 6 are disposed on a base 7 installed on the land 200, and the turbofan 3, the motor 4 and the belt transmission mechanism 5 are installed on the frame 8.

The suction hose 1 is a tubular member in which the tip portion 1a and the base end portion 1b are formed of a rigid body such as metal or hard resin, and an intermediate portion 1c is formed of a flexible body such as soft resin or rubber, for example. The intermediate portion 1c of the suction hose 1 is supported by a support post 9 extending obliquely upward from a lower portion of the frame 8.

The floating support mechanism 2 is a mechanism which supports the tip portion 1a of the suction hose 1 so that the suction port 1d is maintained at a predetermined distance above the water surface 101 as described above.

Figure 4:
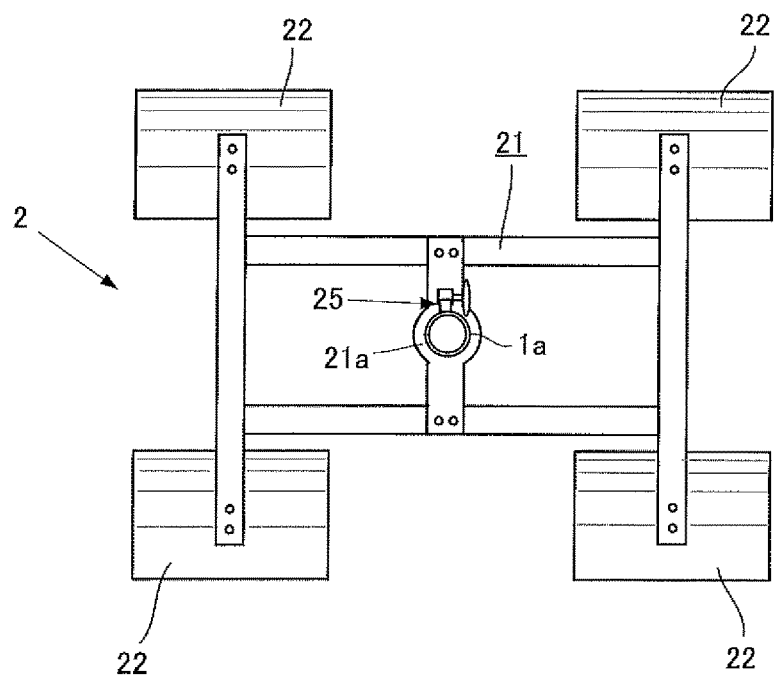
FIG. 4 is a plan view of a floating support mechanism in FIG. 1.

In this example, as shown also in FIG. 4, a frame-shaped support frame 21 which supports the tip portion 1a of the suction hose 1, four cylindrical floats 22 to float the support frame 21 on the water surface 101, and coupling portions 23 which couple the respective floats 22 and the support frame 21 are included. The tip portion 1a of the suction hose 1 is supported by passing it through a center portion 21a of the support frame 21, and a height adjustment mechanism 25 is provided between the tip portion 1a and the center portion 21a.

The height adjustment mechanism 25 is, for example, a rack-and-pinion mechanism, and allows a distance (height) of the suction port 1d of the suction hose 1 from the water surface 101 to be adjusted at 5 to 200 mm. The height adjustment mechanism is not limited to the rack-and-pinion mechanism, and various mechanisms such as an expansion and contraction mechanism and a slide mechanism by using a com can be employed. Further, the height adjustment mechanism may be provided on the coupling portion 23 which couples the float 22 and the support frame 21. The adjustable range is not limited to 5 to 200 mm either.

A configuration of the floating support mechanism 2 can also be variously changed, and the float 22 may be a cylindrical body or a spherical body of a resin, or the like, having smaller specific gravity than the water 100, or may be a hollow body of metal, or the like. A shape and a material of the support frame 21 are also optional.

The height from the water surface 101 to the suction port 1d of the suction hose 1 is determined and adjusted on the site by a worker in consideration of a state of a water surface, an area of a suction region, a height from the water surface to the turbofan 3, states of a ruffle and a flow velocity on the water surface, suction force of the turbofan 3, and the like.

For example, in such a case, as a small amount of oil film is recovered in a place whose water surface is calm, the height of the suction port 1d from the water surface 101 is set to about 5 mm, but in such a case, as a large amount of oil flowed out due to a tanker accident or the like is recovered in high power, it is set to about 200 mm.

As shown in FIG. 2, the turbofan 3 is a blower including the turbo-shaped impeller 32 in the casing 31 having the intake port 31a and the delivery port 31b, and a rotating shaft 33 firmly fixed at the center of the impeller 32 is made to protrude from the rear of the casing 31.

Figure 3:
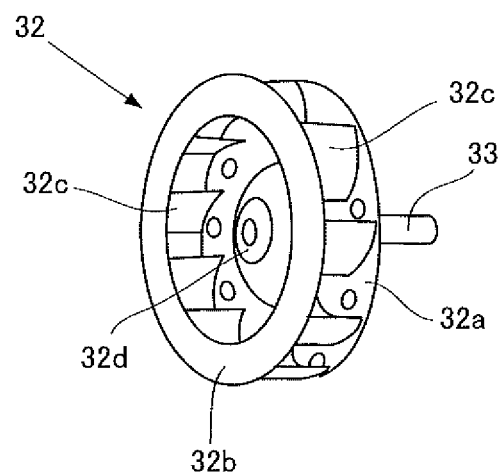
FIG. 3 is a perspective view of a turbo-shaped impeller indicated by dotted lines in FIG. 2.

There are various types of the turbo-shaped impeller 32, and for example, as shown in FIG. 3, a disk portion 32a and a ring portion 32b are faced apart from each other in parallel, and many blades 32c curved with respect to a radial direction are firmly fixed radially therebetween. At the center of the disk portion 32a, the rotating shaft 33 is firmly fixed by a shaft fixing portion 32d.

A typical turbofan is provided integrally with a motor, and a rotating shaft of an impeller is directly coupled to a rotating shaft of the motor. However, this turbofan 3 is not provided integrally with the motor, and the motor 4 is disposed in a position separated from the turbofan 3 with its rotating shaft 41 in parallel to the rotating shaft 33 of the turbofan 3.

As the motor 4, which is an electric motor to drive the turbofan 3, there is desirably used a brushless motor capable of continuous operation for long periods of ten thousand hours to thirty thousand hours or longer. It is desirable that a rotation speed is about 3700 rotations every minute equally to a rated rotation speed of the turbofan 3, and a wattage has an output about 1.5 times as many as a wattage required by normal calculation with respect to a size of the turbofan due to a large load variation.

The belt transmission mechanism 5 is a transmission mechanism to transmit rotational force of the motor 4 to the turbofan 3 to rotate and drive the impeller 32. As shown in FIG. 2, the belt transmission mechanism 5 in this embodiment is constituted to bridge an endless belt 53 between a pulley 51 firmly fixed by passing the rotating shaft (spindle) 41 of the motor 4 through a center hole and a pulley 52 firmly fixed by passing the rotating shaft 33 of the turbofan 3 through a center hole. The pulleys 51 and 52 are made of, for example, metal, reinforced resin, or the like, and the belt 53 is made of, for example, rubber, leather, resin, cloth, or a composite material of them, or the like.

The above structure has been formed due to the following reasons. A conventional turbofan is a device to suck and deliver a gas such as air, and it is not assumed that liquid is mixed therein, resulting in that it does not have a waterproof structure. Therefore, this is because a turbofan directly coupled to a motor sucks water and oil being liquid together with air when used as is conventional as the turbofan to carry out this invention, so that they leak to enter the motor, and the motor fails and becomes non-rotatable.

As in this embodiment, by disposing the turbofan 3 and the motor 4 to be separated from each other, and transmitting the rotational force of the motor 4 through the belt transmission mechanism 5 to the turbofan 3 to rotate and drive the impeller 32, even though the turbofan 3 sucks liquid together with air, continuous operation for long periods becomes possible without a failure of the motor 4.

The oil-water separation tank 6, in which a mixed fluid of air, oil and water delivered from the delivery port 31b of the turbofan 3 is made to flow through the delivery pipe 10 connected to the delivery port 31b, releases air from the mixed fluid into the atmosphere, and separates the oil and the water being liquid by a difference of specific gravity therebetween.

The oil-water separation device is not limited to this oil-water separation tank, and it is possible to use various systems which have been used conventionally, such as a centrifugal separation system and a barrier filter system.

The operation of recovering the oil film floating on the water surface 101 will be explained by the oil film recovery apparatus constituted as described above.

As shown in FIG. 1, the tip portion 1a of the suction hose 1 is supported by the floating support mechanism 2 floated on the water surface 101 on which the oil film floats, and the height of the suction port 1d from the water surface 101 is adjusted to an optimal value according to the situation by the height adjustment mechanism 25.

Then, the motor 4 is supplied with power to be started up, and rotates the impeller 32 at high speed together with the rotating shaft 33 of the turbofan 3 via the belt transmission mechanism 5 by its driving force. Thereby, the turbofan 3 discharges air in the casing 31, thereby generating strong sucking force on the intake port 31a side, and sucking air over the water surface 101 from the suction port 1d through the suction hose 1. At the above occasion, the oil film floating on the water surface 101 and the surface water are mixed with air to be sucked. Accordingly, there occurs a phenomenon in which a suction wind is generated toward the suction port 1d on the water surface, and the oil film around the suction port 1d rides the suction wind, runs by itself toward the suction port 1d, and is sucked in the suction port 1d together with the surface water near the water surface.

Thus, the oil film floating on the water surface 101 is sucked together with air and the surface water near the water surface through the suction hose 1 by sucking force of the turbofan 3, and the mixed fluid of the air, oil and water is delivered from the delivery port 31b of the turbofan 3. The sucking force of the turbofan 3 used here is desirably 2 kPa or more.

The pascal is a unit of pressure and stress in the International System of Units (SI), and is 1 Pa=1 N/m$^2$ (a pressure of 1 newton per 1 square meter).

The sucking force of the turbofan here is a value obtained by measuring, with a vacuum gauge, a negative pressure in the intake port when the intake port 31a of the turbofan 3 is sealed and the impeller 32 is subjected to rated rotation (for example, 3700 rotations every minute).

Because necessary sucking force significantly varies depending on conditions of a length of the suction hose 1, a height of the suction port 1d from the water surface, and the like, the sucking force of the turbofan is preferably 5 to 6 kPa for practically easy use.

The mixed fluid of air, oil and water delivered from the delivery port 31b of the turbofan 3 is fed through the delivery pipe 10 to the oil-water separation tank 6, where air is released into the atmosphere, and oil and water being liquid are separated almost completely in the process of passing through a plurality of separation chambers thereinside by a difference of specific gravity therebetween. The water separated in the oil-water separation tank 6 is discharged through the drainage pipe 11, and returned to the water 100 of a river or the like. The separated oil can be recovered and reused.

Figure 5:
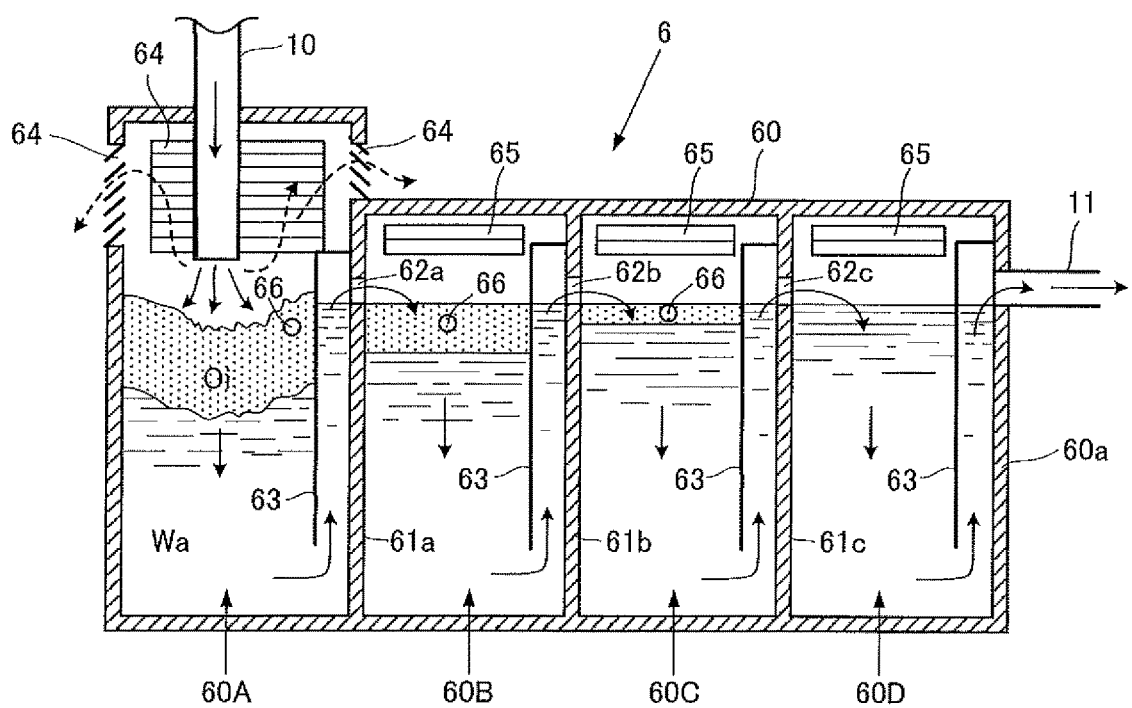
FIG. 5 is a sectional view showing one example of an oil-water separation tank in FIG. 1.

The oil-water separation tank 6 being the oil-water separation device in this embodiment is constituted as its sectional view is shown in FIG. 5.

The interior of a hollow outer case 60 formed in a rectangular parallelepiped shape is divided by partition walls 61a, 61b, and 61c provided at substantially equal intervals in a longitudinal direction, to form a first chamber 60A, a second chamber 60B, a third chamber 60C, and a fourth chamber 60D, and the first chamber 60A is made slightly higher in height than the other chambers.

Through holes 62a, 62b, and 62c are provided through the partition walls 61a, 61b, and 61c in the same height position respectively, and in a substantially same height position as a rear end wall 60a of the outer case 60, a base end portion of the drainage pipe 11 passes through to be connected.

Partition plates 63 are each provided so as to be divided from an upper portion of each of the through holes 62a, 62b, 62c, and the connection port of the drainage pipe 11 to a predetermined height position from the bottom surface, while being spaced in parallel to a surface on the front chamber side of each of the partition walls 61a, 61b, and 61c and an inner surface of the rear end wall 60a.

Windows 64 fitted with armor frames for light shielding are provided in upper peripheral walls of the first chamber 60A portion of the outer case 60, and the delivery pipe 10 passes through an upper wall surface to be inserted.

Small windows 65 fitted with armor frames for light shielding are provided also in upper side walls of the second chamber 60B, the third chamber 60C, and the fourth chamber 60D. The armor frames are provided in order to prevent rain and dust from entering the tanks and prevent occurrence of algae by shielding outside light.

Oil recovery holes 66 are provided in positions slightly lower than the through holes 62a, 62b, and 62c in side walls of the first chamber 60A, the second chamber 60B, and the third chamber 60C portions of the outer case 60 respectively.

In the oil-water separation tank 6 constituted as described above, the mixed fluid of air, oil and water flows from the turbofan 3 through the delivery pipe 10 into the upper portion of the first chamber 60A, and most of the air among them is released through the windows 64 into the atmosphere. A water Wa and an oil Oi being liquid are collected in the first chamber 60A, and the water Wa having large specific gravity is collected mainly in a lower portion thereof, and the oil Oi having small specific gravity floats and is collected mainly in an upper portion thereof.

Then, the water Wa in the lower portion of the first chamber 60A (some oil Oi disperses) enters the inside of the partition plate 63 and flows from the through hole 62a into the second chamber 60B as indicated by arrows. The oil contained in it floats in the upper side of the second chamber 60B, and the water in a lower portion thereof flows through the through hole 62b into the third chamber 60C. Air is released from the small windows 65 into the atmosphere if contained.

Thus, almost only water content of the water containing oil slightly in each of the chambers 60A, 60B, and 60C is made to flow from each of the through holes 62a, 62b, and 62c into the next chamber, and the water in the fourth chamber 60D is delivered from a lower portion thereof through the inside of the partition plate 63 to the upper drainage pipe 11.

The oil floating in upper portions of the first chamber 60A, the second chamber 60B, and the third chamber 60C is made to flow from the oil recovery holes 66 to the outside thereof, and recovered by not-shown pipes. An outflow of oil from each of the oil recovery holes 66 is preferably adjusted according to the collection situation of oil in each of the chambers by a valve or the like.

When the water content still remains in the recovered oil, the water content is preferably removed by further performing oil-water separation.

According to the oil film recovery apparatus and the oil film recovery method according to this invention, as compared with conventional oil film recovery apparatus and oil film recovery method of drawing and sucking an oil film from the water side near a water surface by using a submersible pump, a recovery ratio of oil film improves significantly by 2 to 3%. That is, it is possible to reduce a ratio of water to oil in the sucked oil-water mixed solution to 1/3 to 1/4 of the conventional one, and to downsize an oil-water separation tank to 1/2 to 1/3. That makes it possible to reduce production costs of the entire system including as far as the oil-water separation tank to 1/2 or less.

In addition, without making the suction impossible in a short period of time as in a conventional example of using a vacuum pump, continuous operation for ten thousand to thirty thousand hours or longer is possible, and it becomes possible to efficiently recover a large amount of oil film.

Accordingly, the oil film recovery apparatus and the oil film recovery method according to this invention are very effective in treatment of wastewater including oil content in an oil refinery, various plant companies, a steel plant, a thermal power station, a paper-manufacturing company, and so on, countermeasures against oil spill accident in a river, on the sea, or the like, and the like.

Incidentally, foreign matter such as debris or leaves also floats on the water surface 101 on which the oil film floats, and sucking them together with the oil film causes an increase in suction resistance in the suction hose 1, a load increase or a failure of the turbofan 3, and the like, and also leads to a malfunction of the oil-water separation tank 6.

Therefore, a net of wire mesh or the like for preventing foreign matter from being sucked is preferably provided to attach it to the floating support mechanism 2 from above water toward the water at or around the suction port 1d of the suction hose 1.

In that case, it is desirable that a plurality of nets are provided apart from one another, the net on an outer side far from the suction port 1d is made coarse mesh, and the net on an inner side closer to the suction port 1d is made finer mesh.

Note that a material of the net, a size of mesh thereof, an installation position thereof, and the like are required to be considered so that a flow of the oil film is not prevented by the net.

Further, in the embodiment shown in FIG. 1, on the base 7 provided on the land 200, the respective parts other than the suction hose 1 and the floating support mechanism 2 of the oil film recovery apparatus are put. However, it is also possible to mount these on a vehicle such as an automobile and move them along a river, a pool, or the like, or to put these in a water sailing body such as a ship or a boat and move them freely to the water area in which the oil film floats by moving on water.

Note that when the oil film recovery apparatus is mounted on the vehicle, the ship, or the like, there is no space on which the oil-water separation tank 6 described above as the oil-water separation device can be mounted in many cases. In such cases, it is preferable to use such an oil-water separation device being compact in size and having high efficiency, as a centrifugal separator. Alternatively, after recovering the oil-water mixed solution in a tank or the like, oil-water separation may be performed separately by an oil-water separation device installed on land.

In a case where there is sufficient space, such as a case of installing the oil film recovery apparatus in a site of a factory, it is desirable to provide the oil-water separation tank which separates oil and water by a specific gravity difference as described above as the oil-water separation device. That is because the absence of a movable part results in no failure and also easy maintenance.

The above explains an embodiment of this invention, but the specific configuration of parts, the contents of treatment, and the like of the embodiment are not limited to the ones described therein.

Further, it goes without saying that this invention is not limited to the above-described embodiment, and is not limited to anything except to have a technical feature described in each claim of the patent claims.

Moreover, the configuration example, the operation example, the modification example, and the like of the embodiment explained above may be appropriately changed or added, or partially omitted, and can also be carried out by an arbitrary combination thereof as long as consistent with one another.

The oil film recovery apparatus and the oil film recovery method according to this invention are very effective in being used for treatment of wastewater including oil content in an oil refinery, various plant companies, a steel plant, a thermal power station, a paper-manufacturing company, and so on, countermeasures against oil spill accident in a river, on the sea, or the like, and the like.

REFERENCE LIST

1: suction hose 1*a*: tip portion 1*b*: base end portion 1*c*: intermediate portion 1*d*: suction port 2: floating support mechanism 3: turbofan 4: motor 5: belt transmission mechanism 6: oil-water separation tank 7: base 8: frame 9: support post 10: delivery pipe 11: drainage pipe 21: support frame 21*a*: center portion 22: float 23: coupling portion 25: height adjustment mechanism 31: casing 31*a*: intake port 31*b*: delivery port 32: impeller 32*a*: disk portion 32*b*: ring portion 32*c*: blade 32*d*: shaft fixing portion 33: rotating shaft of turbofan 41: rotating shaft of motor 51, 52: pulley 53: belt 60: outer case 60A: first chamber 60B: second chamber 60C: third chamber 60D: fourth chamber 61*a*, 61*b*, 61*c*: partition wall 62*a*, 62*b*, 62*c*: through hole 63: partition plate 64: window fitted with armor frame 65: small window fitted with armor frame 66: oil recovery hole 100: water (river, sea, lake, swamp, pond, pool or the like) 101: water surface 200: land

The invention claimed is:

1. An oil film recovery apparatus comprising:
a suction hose;
a floating support mechanism which supports a tip portion of the suction hose so that a suction port is maintained at a predetermined distance above a water surface;
a turbofan including a turbo-shaped impeller in a casing having an intake port and a delivery port, in which a base end portion of the suction hose is connected to the intake port;
a motor disposed to be separated from the turbofan; and
a belt transmission mechanism which transmits rotational force of the motor to the turbofan to rotate and drive the impeller,
wherein an oil film floating on the water surface is sucked and recovered together with air over the water surface and surface water near the water surface from the suction port through the suction hose by suction force of the turbofan.

2. The oil film recovery apparatus according to claim 1, further comprising an oil-water separation device which releases air from a mixed fluid of air, oil and water delivered from a delivery port of the turbofan into an atmosphere, and separates oil and water.

3. The oil film recovery apparatus according to claim 2, wherein a suction force of the turbofan is 2 kPa or more.

4. The oil film recovery apparatus according to claim 3, wherein the motor is a brushless motor.

5. The oil film recovery apparatus according to claim 2, wherein the motor is a brushless motor.

6. The oil film recovery apparatus according to claim 1, wherein a suction force of the turbofan is 2 kPa or more.

7. The oil film recovery apparatus according to claim 6, wherein the motor is a brushless motor.

8. The oil film recovery apparatus according to claim 1, wherein the motor is a brushless motor.

9. The oil film recovery apparatus according to claim 1, wherein the turbofan is located remotely from the tip portion of the suction hose.

10. The oil film recovery apparatus according to claim 1, wherein the turbofan is located remotely from the floating support mechanism.

11. An oil film recovery method comprising:
supporting a tip portion of a suction hose so that a suction port is maintained at a predetermined distance above a water surface; and
sucking and recovering an oil film floating on the water surface together with air over the water surface and surface water near the water surface from the suction port through the suction hose by suction force of a turbofan generated by transmitting rotational force of a motor disposed to be separated from the turbofan via a belt transmission mechanism to the turbofan to rotate and drive a turbo-shaped impeller of the turbofan.

12. The oil film recovery method according to claim 11, wherein a suction force of the turbofan is 2 kPa or more.

13. The oil film recovery method according to claim 11, wherein the tip portion of the suction hose is supported by a floating support mechanism, and the turbo-shaped impeller of the turbofan is disposed in a casing having an intake port and a delivery port, with a base end portion of the suction hose being connected to the intake port.

14. The oil film recovery method according to claim 13, wherein the turbofan is located remotely from the tip portion of the suction hose.

15. The oil film recovery method according to claim 13, wherein the turbofan is located remotely from the floating support mechanism.

* * * * *